US008918764B2

(12) United States Patent
Masser et al.

(10) Patent No.: US 8,918,764 B2
(45) Date of Patent: Dec. 23, 2014

(54) SELECTIVE TRACE FACILITY

(75) Inventors: Joel L. Masser, San Jose, CA (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 13/238,197

(22) Filed: Sep. 21, 2011

(65) Prior Publication Data

US 2013/0074050 A1    Mar. 21, 2013

(51) Int. Cl.
  *G06F 9/44* (2006.01)
  *G06F 11/14* (2006.01)
  *G06F 11/30* (2006.01)
  *G06F 11/36* (2006.01)

(52) U.S. Cl.
  CPC .............. *G06F 9/44* (2013.01); *G06F 11/3636* (2013.01); *G06F 11/14* (2013.01); *G06F 11/3055* (2013.01)
  USPC ............................. 717/128; 717/131; 717/132

(58) Field of Classification Search
  USPC ............. 717/110–135; 714/26–38.14, 43–45; 709/206–207, 224–229
  See application file for complete search history.

(56) References Cited

U.S. PATENT DOCUMENTS

| | | | |
|---|---|---|---|
| 6,658,416 B1 * | 12/2003 | Hussain et al. | 1/1 |
| 6,678,883 B1 * | 1/2004 | Berry et al. | 717/128 |
| 7,386,839 B1 * | 6/2008 | Golender et al. | 717/131 |
| 7,496,901 B2 * | 2/2009 | Begg et al. | 717/128 |
| 7,506,314 B2 | 3/2009 | Kollmann et al. | |
| 7,661,135 B2 * | 2/2010 | Byrd et al. | 726/22 |

(Continued)

FOREIGN PATENT DOCUMENTS

JP    2005346414 A  * 12/2005  ........ H04L 29/08675

OTHER PUBLICATIONS

Pascual et al., A flexible software for tracking of markers used in human motion analysis, 2002 Elsevier Science Ireland Ltd., pp. 155-165.*

(Continued)

*Primary Examiner* — Satish Rampuria
(74) *Attorney, Agent, or Firm* — Kunzler Law Group

(57) ABSTRACT

An approach to selectively recording trace data. The approach sifts through process control and state data to store data that is most relevant to aiding debugging while reducing the overall amount of data that is stored in a trace data set by a trace facility. The approach may involve initiating a trace operation for the software component and, for each resource of the software component, determining whether the resource is currently in use. For those resources in use, the current state of the resource is compared with the previous state of the resource. If the current state has changed, the current state is written to the trace data set. If the resource is not in use, or the current state has not changed, no entry is made to the trace data set. The approach may also analyze users to determine which resources the users are holding and/or waiting for.

16 Claims, 5 Drawing Sheets

(56) References Cited

U.S. PATENT DOCUMENTS

| | | |
|---|---|---|
| 2003/0145255 A1 | 7/2003 | Harty et al. |
| 2004/0139142 A1* | 7/2004 | Arwe .............................. 709/200 |
| 2006/0005083 A1 | 1/2006 | Genden et al. |
| 2006/0184837 A1 | 8/2006 | Al-Omari |
| 2007/0140301 A1* | 6/2007 | Kailash et al. ................. 370/498 |
| 2007/0226701 A1 | 9/2007 | Suonvieri et al. |
| 2008/0126828 A1* | 5/2008 | Girouard et al. .................. 714/2 |
| 2008/0127112 A1* | 5/2008 | Kettley et al. .................. 717/128 |
| 2008/0134148 A1* | 6/2008 | Clark ............................. 717/128 |
| 2008/0148231 A1* | 6/2008 | Weber ........................... 717/120 |
| 2009/0249046 A1 | 10/2009 | Berg et al. |
| 2010/0083248 A1 | 4/2010 | Wood et al. |
| 2011/0113291 A1 | 5/2011 | Ike |
| 2011/0172963 A1 | 7/2011 | Gu et al. |

OTHER PUBLICATIONS

Berg et al., Tracing Software Product Line Variability—From Problem to Solution Space, Proceedings of SAICSIT 2005, pp. 182-191.*

Hrischuk et al., Trace-Based Load Characterization for Generating Performance Software Models, IEEE Transactions on Software Engineering, vol. 25, No. 1, Jan./Feb. 1999, pp. 122-135.*

C. Eric Wu et al., From Trace Generation to Visualization: A Performance Framework for Distributed Parallel Systems, Proceedings of the IEEE/AMC SC2000 Conference, Nov. 2000, 18 pages.

Pradeep K. Dubey et al.. "Profile-Driven Generation of Trace Samples", 1996 IEEE International Conference, Oct. 1996, pp. 217-224.

* cited by examiner

SELECTIVE TRACE FACILITY

FIELD

The subject matter disclosed herein relates to tracing data related to serialization errors in software.

BACKGROUND

Software problems frequently crop up even in well-designed applications. One tool that developers use to detect and debug software problems is a trace facility. A trace facility logs information about the operations of software in order to facilitate debugging and diagnostic efforts. The software tracing provides information that is useful for programmers and developers when debugging the software. The tracing is often performed at a low level in the software.

Because tracing is often performed at a low level, it can generate large amounts of data. Having such large amounts of data can generate various problems. It can be difficult for programmers to sift through such large amounts of data in order to find a bug. Saving such large amounts of data can have a negative impact on the lifespan of the trace data; for example, many trace facilities store trace data in a file or data set that wraps when the file is filled. If the trace data is filling the file with irrelevant data, valuable information can be lost when the trace facility starts overwriting earlier data. Valuable trace data can be overwritten with less valuable trace data when the trace facility is logging large numbers of events.

In addition, the trace facility can impact performance in the system when it is writing large amounts of data. A large number of write commands may be generated as the software executes in order to preserve that trace data in the appropriate file or other data structure. These frequent write commands can have a negative impact on how the software performs when the trace facility is active. As a result, a programmer may disable the trace facility at compile time or run time. If an error occurs and the trace facility is turned off, the programmer does not have the benefit of the trace data in attempting to debug the error. Furthermore, having a trace facility that negatively impacts performance decreases the likelihood that the trace facility can be enabled on software provided to a customer. As a result, the programmer may not have access to what would be valuable information about errors occurring during actual operation of the software by the customers.

BRIEF SUMMARY

An approach to improved software tracing for a software component is disclosed. The summary that follows is for convenience, and is not a limitation on the claims.

The invention may be realized as a computer program product stored on a computer readable storage medium for performing a software trace of a software component. The computer-readable storage medium may be a non-transitory storage medium. The computer program product may include instructions for initiating a trace operation for the software component. The trace operation may include determining, for each resource of the software component, whether the resource is currently in use. For each resource that is not currently in use, the trace operation may move to the next resource without writing the current state for the resource.

For the resources that are currently in use, the instructions may include comparing the current state of the resource to a previous state of the resource. If the current state of the resource has changed from the previous state, the current state for the resource may be written to a trace data set. If the current state has not changed from the previous state, the trace operation may move to the next resource without writing the current state for the resource to the trace data set.

The trace operation may also include, for each resource of the software component, determining which users are waiting for the resource and recording the identity of the users that are waiting for the resource in the trace data set.

The trace operation may also include, for each user of the software component, writing the current state for the user to the trace data set if the user is waiting for one or more resources. The trace operation may also write the current state for the user to the trace data set if the user has exclusive use of one or more resources, or shared use of one or more resources. If the user is waiting for one or more resources, the trace operation may involve writing the current state to the trace data set. The current state may include, in such a situation, the identification of the user that owns the resources being waited for, and the state of each user that owns the resources being waited for.

The trace operation may be initiated at the expiration of a trace interval. The length of the trace interval may be dynamically adjusted. Dynamically adjusting the trace interval may involve decreasing the length of the trace interval during periods of high resource contention for the software component. Dynamically adjusting the length of the trace interval may comprise increasing the length of the trace interval during periods of low resource contention for the software component.

The computer program product may also include instructions for writing the current state for the resource as derived from transaction progress markers that are created between timing intervals.

The present invention may be realized in a variety of forms. The present invention may be realized as a computer program product, a system, a method, or other form. References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
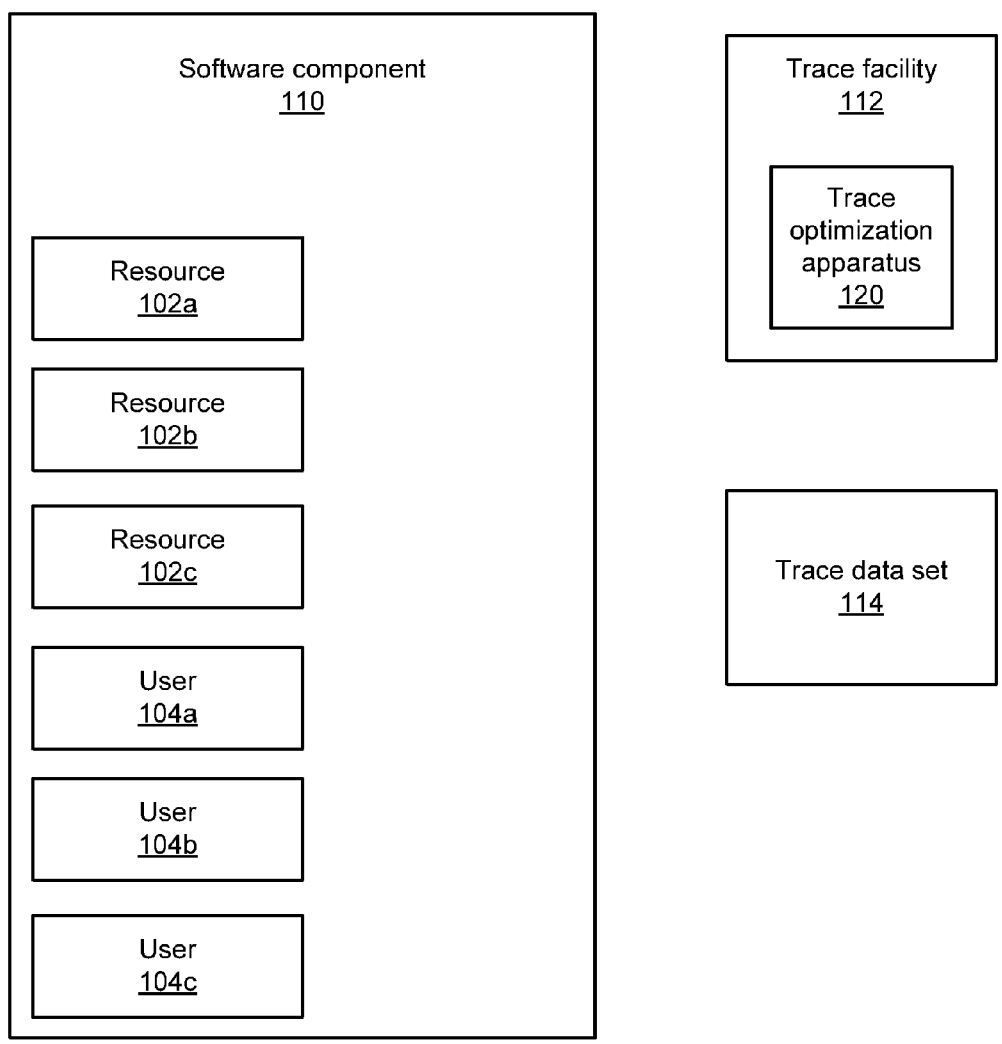
FIG. 1 is an illustrative block diagram showing one embodiment of a system comprising a software component, a trace facility, and a trace data set.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. The computer readable medium may be non-transitory.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 depicts one embodiment of a system 100 comprising a software component 110, a trace facility 112, and a trace data set 114. The software component 110 is software comprising instructions stored in memory that are executed by a processor. The software component 110 may perform a variety of functions. The software component 110 may be, for example, an Internet browser, a virtual storage access method (VSAM) component operating on a z/OS operating system, a file system, or other variety of software component 110.

The software component 110 may have a plurality of resources 102a-c. While FIG. 1 represents the resources 102 as being within the software component 110, the resources 102 may be distributed throughout the system 100. As used herein, the term "resource" refers to a logical, virtual, or physical entity that is shared by a plurality of users in a serialized fashion. Serialization, or process synchronization, is the synchronization of access to resources 102. For example, users 104 (such as concurrently-executing threads or processes) may not be allowed to execute specific portions of a software component 110 at the same time. When a process has begun executing a resource 102, other processes must wait until the first process finishes before accessing the resource 102.

A resource 102 may be, for example, a file. While multiple users 104 may be allowed to simultaneously read a file, only one user 104 may be permitted to write to a file at a time. While the user 104 is writing the file, the other users 104 may be prevented from writing to the file or reading from the file until the user 104 completes the write. A resource 102 may be a portion of code that only one user 104 is permitted to execute at a time. A resource 102 may be a hard disk drive (HDD) and its related drivers. Only one user 104 may be permitted to access the HDD at one time, and the operating system may be responsible for ensuring that only one user 104 access the HDD at a time. Other examples of resources 102 will be appreciated by those in the art.

The software component 110 may also have a plurality of users 104a-b. While FIG. 1 represents the users 104 as being within the software component 110, the users 104 may be distributed throughout the system 100. As used herein, the term "user" refers to an entity, whether human or machine, that accesses and uses the resources 102. A user may be, for example, a program, or a portion of a program.

The system 100 also includes a trace facility 112. The trace facility 112 accesses the software component 110's process control and state data and stores trace entries that contain information about the resources 102 and the users 104. The trace facility 112 may be implemented as part of the software component 110, or implemented separately from the software component 110. The trace facility 112 may access the process control and state data in common storage, in the software component 110's address space, via cross-memory services, or through other approaches.

The trace facility 112 also includes a trace optimization apparatus 120. The trace optimization apparatus 120 selectively writes state data about the resources 102 and the users 104 to the trace data set 114. By selectively writing state data, the trace data set 114 does not fill more quickly than necessary, and the contents of the trace data set 114 are more likely to be relevant when diagnosing serialization problems in the software component 110. In certain embodiments, the trace optimization apparatus 120 also dynamically adjusts the frequency with which the trace facility 112 gathers state data based on the conditions of the system 100.

The trace data set 114 is a data set, file, database, or other suitable data structure for storing information written by the trace facility 112. Programmers may access the data within the trace data set 114 when diagnosing and addressing bugs in the software component 110. The trace data set 114 may be kept in non-volatile memory in order to facilitate retention of the information written by the trace facility 112 in the event of an error in the software component 110. The information written by the trace facility 112 to the trace data set 114 may be referred to as trace entries.

Figure 2:
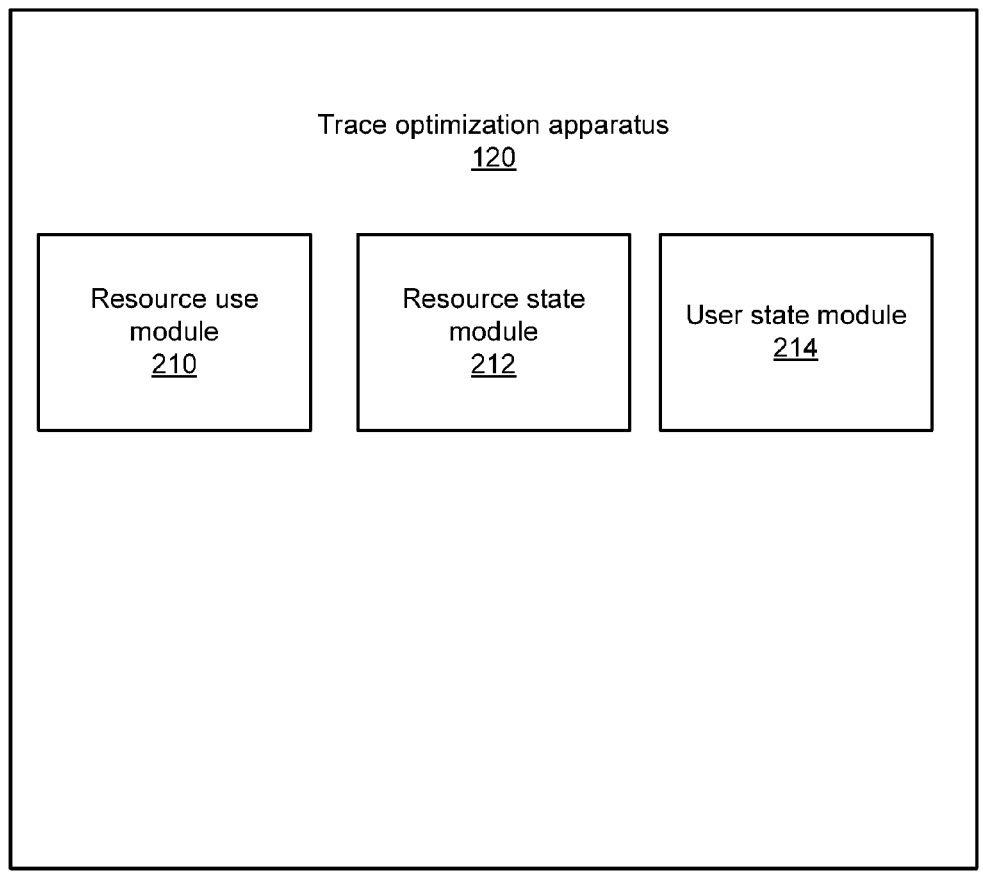
FIG. 2 is an illustrative block diagram showing one embodiment of a trace optimization apparatus.

FIG. 2 shows one embodiment of the trace optimization apparatus 120. The trace optimization apparatus 120 may initiate a trace operation for the software component 110. The trace operation may comprise the resource use module 210 determining, for each resource 102 of the software component 110, whether the resource 102 of the software component is currently in use by the software component 110. If the resource use module 210 determines that the resource 102 being examined is not in use, the resource use module 210 may move to the next resource 102 without writing state information for the resource 102 that is not currently in use.

The resource use module 210 may determine that the resource 102 is currently in use. The resource use module 210 may compare the current state of the resource 102 to the previous state of the resource 102. The previous state of the resource 102 may be retrieved from the trace data set 114, retrieved from volatile memory, or from another appropriate location. The resource use module 210 may write state information for the resource 102 to the trace data set 114 if the resource use module 210 determines that the state of the resource 102 has changed from the previous state. If the current state has not changed from the previous state, the resource use module 210 may move to the next resource 102 without writing state information for the resource 102 to the trace data set 114.

The preceding paragraphs discussed a state of a resource 102. A user 104 may similarly have a state. As used herein, the terms "state" refers to the measure of various conditions related to a resource 102 (in the case of the state of a resource 102) or a user 104 (in the case of the state of a user 104). The precise metrics that constitute a state may vary with the preference of an administrator or a designer. State data for resources 102 and users 104 is typically maintained by a software component 110.

The resource state module 212 may write the current state to the trace data set 114 as part of a trace entry. The trace entry may also include a timestamp and an identification of the resource 102, identification of the current users 104 of the resource 102, whether the user of the resource 102 by the users 104 is exclusive or shared, and the state of the users 104. Other information may also be included within the trace entry. The resource state module 212 may also, for each resource 102 of the software component 110 that is currently in use, determine the users 104 that are waiting for the resource 102 and record the identity of the users 104 waiting for the resource 102 in the trace data set 114.

The users 104 may be identified by a transaction ID, by an address of a control block that represents the user 104, or through other information. Identifying information may also include the request type, the request start time, or a key field. Various pieces of information, alone or jointly, may serve to adequately identify the user 104.

The resource state module 212 may perform the comparison of the previous state of the resource 102 and the current state of the resource 102, and make appropriate trace entries, until all resources 102 that are in use have been checked and appropriate trace entries have been made.

The trace optimization apparatus 120 may also include a user state module 214. The user state module 214 may, for each user 104 of the software component 110, write the current state of the user 104 to the trace data set 114 if the user 104 is waiting for one or more of the resources 102. The user state module 214 may also write the current state of the user 104 if the user 104 is using one of the resources 104. For example, the user state module 214 may write the current state of the user 104 and specify that the user 104 has exclusive use of one or more resources 104, or shared use of one or more resources 104.

The user state module 214 may determine that a particular user 104 is waiting for a resource 102. In response, the user state module 214 may identify the resource 102 that the user 104 is waiting for and write the identification of the resource to the trace data set 114. The user state module 214 may also write the identification of the users 104 that own the resources 102 that the user 104 is waiting for to the trace data set 114, along with the state of the users 104 that own the resources 102.

If a user 104 is waiting for a resource 102, the user state module 214 may identify this as a potential deadlock situation and record additional information to the trace data set 114. For example, the user 104a may be waiting for resource 102a, which is being used by user 104b. If user 104b is waiting for resource 102c, the user state module 214 may build a chain of owning/waiting users 104 that describe the serialization relationships between the resources 102 and users 104 that would be helpful in debugging serialization errors. This chain may be stored in the trace data set 114.

In certain embodiments, the user state module 214 checks the current state of the user 104 against the previous state of the user 104. If the state has not changed, the user state module 214 may move to the next user 104 without writing the current state of the user 104 to the trace data set 114. For example, if the current state of the user 104a indicates that the user 104a is waiting for the resource 104b, and the previous state of the user 104a indicated that the user 104a was waiting for the resource 104b, the user state module 214 may proceed to the user 104b without writing the current state of the user 104a.

Figure 3:
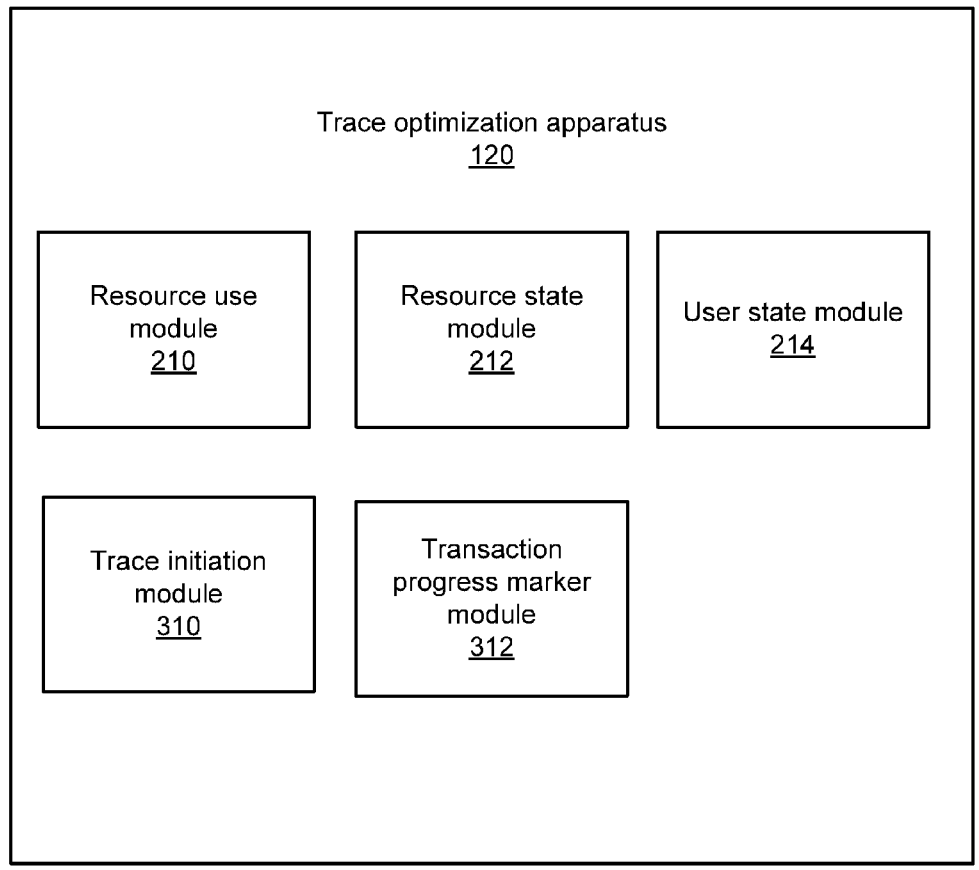
FIG. 3 is an illustrative block diagram showing a second embodiment of a trace optimization apparatus.

FIG. 3 shows a second embodiment of the trace optimization apparatus 120. In one embodiment, the trace optimization apparatus 120 includes a trace initiation module 310. The trace initiation module 310 may be responsible for initiating a trace operation, such as the one described in connection with FIG. 2, at the expiration of a trace interval. The trace interval is a period of time that triggers, upon expiration, initiation of a trace operation. The trace interval may be a default value. In other embodiments, a programmer of other person can adjust or set the length of the trace interval.

The trace initiation module 310 may be further configured to dynamically adjust the length of the timing interval. The trace initiation module 310 may decrease the length of the trace interval during periods of high resource contention for the software component 110. Periods of high resource contention may be prime situations for serialization errors to occur. As a result of decreasing the length of the trace interval, the trace optimization apparatus 120 may take more samples of state information, resulting in a more complete record to aid in debugging.

Conversely, the trace initiation module 310 may dynamically adjust the length of the trace interval by increasing the length of the trace interval during periods of low resource contention for the software component. Increasing the length of the trace interval may reduce the number of samples of state information taken during periods where serialization errors are less likely to occur. As a result, space within the trace data set 114 may be preserved, and the strain on the computing resources that execute the trace optimization apparatus 120 may be reduced.

The trace optimization apparatus 120 may also include a transaction progress marker module 312 that derives state information of resources 102 and users 104 from transaction progress markers. Certain software components 110 may use transaction progress markers when performing certain tasks. The transaction progress markers are used to indicate progress of a request or transaction. If an error arises, the transaction progress markers can be used to roll back the transaction. For example, a banking transaction that transfers funds from one account to another may involve the steps of debiting a first account for the amount to be transferred, and crediting the second account with the amount to be transferred. A transaction progress marker may be created when the first account has been debited. The transaction progress marker may be used to allow the debit to be rolled back should the credit to the second account fail.

The above is simply on example of a simple use of transaction progress markers. Transaction progress markers may be created that indicate state changes to various resources 102 and users 104 of the software component 110. The transaction progress marker module 312 may derive these state changes from the transaction progress markers and save the state changes to the trace data set 114.

In certain embodiments, the transaction progress marker module 312 actively monitors for the creation of transaction progress markers at all times. In other embodiments, the transaction progress marker module 312 checks for transaction progress markers as part of the trace operation that is initiated upon completion of the trace interval. The transaction progress marker module 312 may be able to determine and save state changes that occurred between trace operations, as these state changes may be saved in the transaction progress markers.

Figure 4:
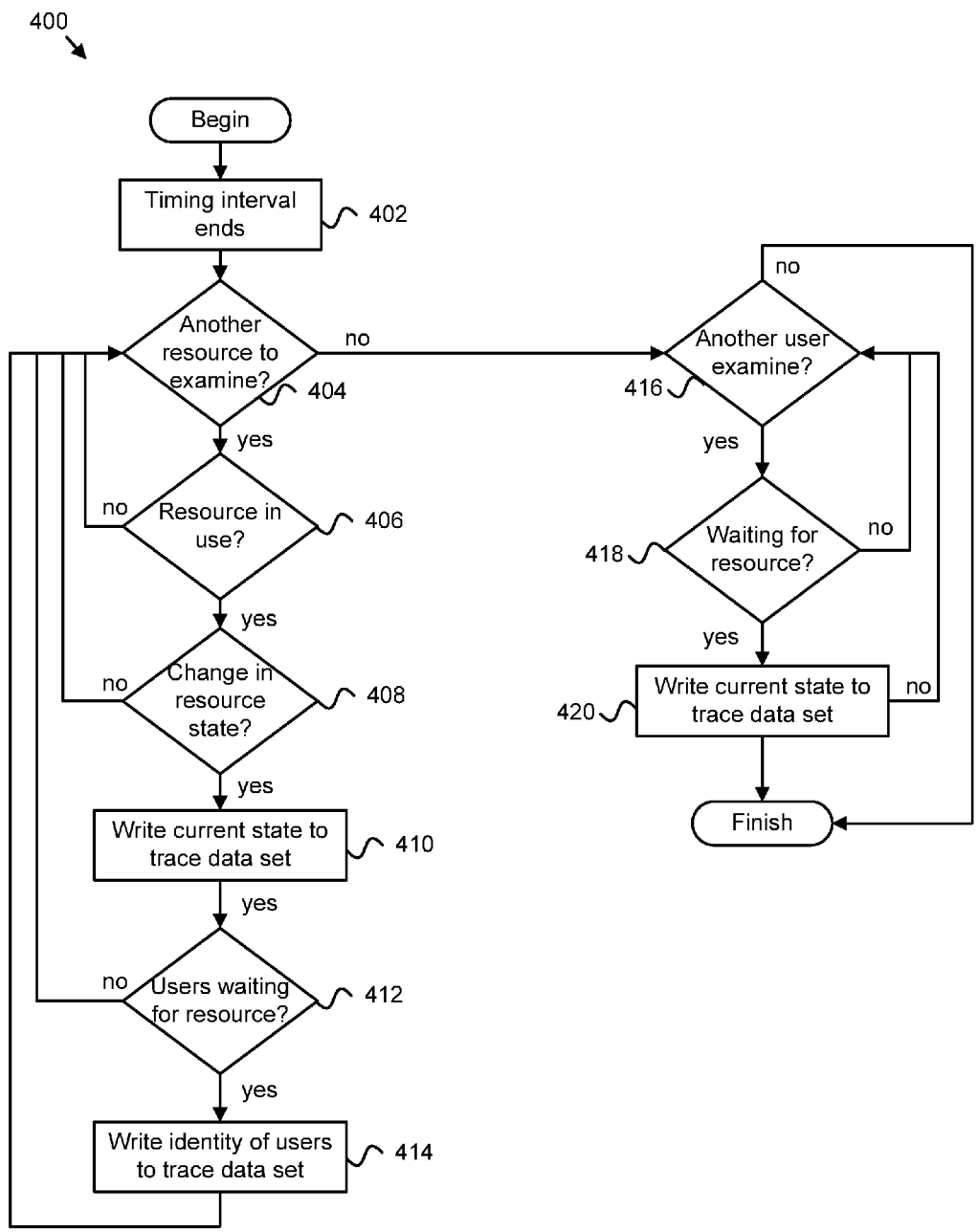
FIG. 4 is a flow chart diagram showing one embodiment of a method for conducting intelligent software tracing.

FIG. 4 illustrates one embodiment of a method 400 for performing a software trace. In one embodiment, the method 400 begins when the timing interval ends 402. As discussed above, the length of the timing interval may be dynamically adjusted based on the status of the system in order to increase the likelihood that relevant state data will be gathered when serialization errors are most likely to occur. The data gathering that occurs at the expiration of a timing interval may also be supplemented with data gathering that occurs based on transaction progress markers that are created between trace operations.

In one embodiment, the method 400 involves determining 404 whether there is a resource 102 of the software component 110 to examine. If there is a resource 102 to examine, the method 400 may then involve determining 408 whether the resource 102 has had a change in state since the last time state data for the resource 102 was written to the trace data set 114. This may involve comparing the current state of the resource 102 with a previous state of the resource 102. If there is no change, the method 400 may involve moving on to the next resource 102, if there is one. If there is a change, the method 400 may involve writing 410 the current state for the resource 102 to the trace data set 114. The current state may be written to the trace data set 114 as part of a trace entry that also includes additional information.

The method 400 may also involve determining 412 whether there are any users 104 waiting for the resource 102. If not, the method 400 may involve proceeding to the next resource 102 (if any) of the software component 110. If there are users 104 waiting for the resource 102, the method may involve writing 414 the identity of the users 104 to the trace data set 414. Examples of data that can be used to identify the user 104 are given above. Additional information may also be written; for example, the current state of the users 104 waiting for the resource 102 may be written to the trace data set 114. Data that identifies the resources 102 owned or shared by the users 104 waiting for the resource 102 may also be written. As noted above, a chain of waiting users 104 may be constructed and written to the trace data set 114.

The method 400 may repeat the steps 406 through 414 for each resource 102 of the software component 110. When all resources 102 have been examined, the method 400 may further involve looking at each user 104 of the software component 110. The method 400 may determine 416 whether there is another user to examine. If there are no users 104 to examine, the method 400 may end.

If there is a user 104 using the software component 110, the method 400 may involve determining 418 whether the user 104 is waiting for a resource 102. If the user 104 is waiting for a resource 102, the method 400 may involve writing 420 the current state of the user 104 to the trace data set 114. In certain embodiments, the method 400 only writes the current state of the user 104 if a previous state of the user 104 is different from the current state. For example, if the current state would indicate that the user 104*a* is waiting for resource 102*b*, and the previous state also indicated that the user 104*a* was waiting for resource 102*b*, the method 400 may forgo writing the current state to the trace data set 114 as the entry may be considered redundant. When the current state of the user 104 is written, the method 400 may further comprise determining 416 whether there is another user 104 to examine. This process may repeat until all users 104 of the software component 110 have been examined.

Figure 5:
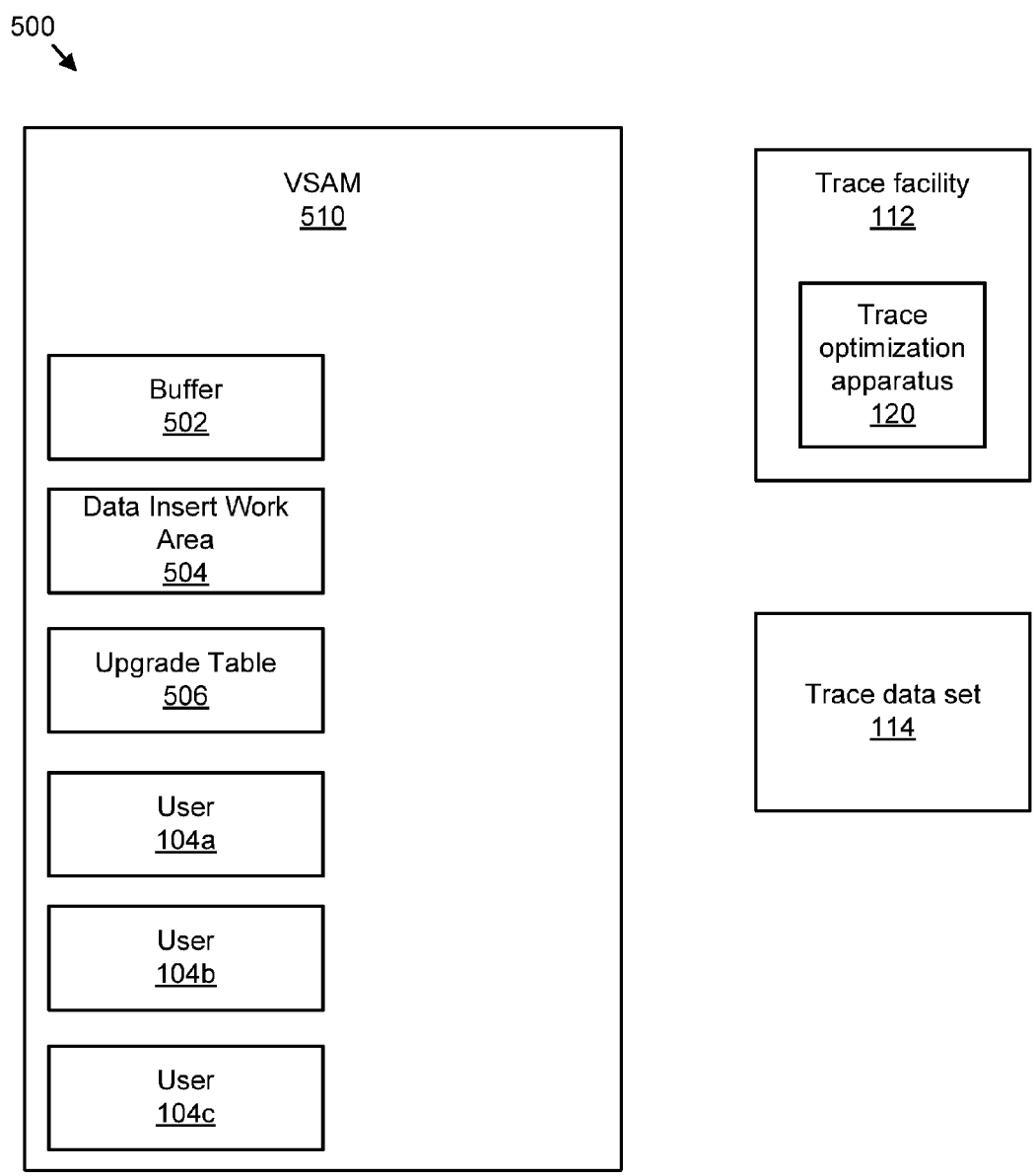
FIG. 5 is an illustrative block diagram showing one example of a system comprising a virtual storage access method (VSAM), a trace facility, and a trace data set.

FIG. 5 illustrates one example of a trace facility 112 providing intelligent trace functionality. The example in FIG. 5 is given by way of illustration, and not as a limitation. While FIG. 5 specifically discusses implementation of a trace facility in a VSAM environment, the present invention may have broader applicability and can be used in other environments.

FIG. 5 illustrates a system 500 that includes a VSAM 510, a trace facility 112, and a trace data set 114. The VSAM 510 is one example of a software component 110. VSAM 510 is an IBM® disk file storage access method. VSAM 510 may include a variety of resources 102. In the depicted embodiment, the VSAM 510 includes the following resources 102:

buffer 502; data insert work area 504; and upgrade table 506. The VSAM 510 may also include resources 102 in addition to those shown in FIG. 5.

The trace facility 112 with the trace optimization apparatus 120 may, upon expiration of the trace interval, initiate a trace operation for the VSAM 510. The trace optimization apparatus 120 may examine each of the resources 102 to determine whether it is in use. The trace optimization apparatus 120 may, for example, determine whether the buffer 502 is in use, and compare the current state of the buffer 502 with the previous state of the buffer 502. The trace optimization apparatus 120 may write the current users 104 who are exclusive holders of the buffer 502, or those users 104 that are sharing the buffer 502 to the trace data set 114. The trace optimization apparatus 120 may also write the current state of those users 104. The current state may indicate whether the user 104 is running or waiting, and what resources 102 the user 104 holds and/or is waiting for.

In certain embodiments, the trace optimization apparatus 120 records the difference in the contents of the buffer 502 that have occurred since a previous trace operation. The trace optimization apparatus 120 may also record the difference in the state of the buffers 502 since the previous trace operation. The amount of information, and the nature of the information recorded by the trace optimization apparatus 120 may vary based on the needs of the system administrator. The system administrator may be able to adjust and set what information is recorded by the trace optimization apparatus 120 during the trace operations.

The trace optimization apparatus 120 may also access transaction progress markers to derive state information for the resources 102 and the users 104. The trace optimization apparatus 120 may access placeholder footstep progress marks and the saved high water mark from the preceding trace cycle in order to determine whether any resources 102 were obtained and released during the preceding interval, and that would thus not appear as currently in use.

In certain embodiments, the trace optimization apparatus 120 also records any transaction progress markers that would be useful in serialization problem determination to the trace data set 114. For example, the starting and completing of a VSAM request, or the entering or leaving of a wait state or a deferred state, may be recorded.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product stored on a computer-readable storage medium for performing a software trace of a software component, the computer program product comprising instructions for:
    initiating a trace operation for the software component, the trace operation comprising:
        for each resource of the software component, determining whether the resource is currently in use;
        for each resource that is currently in use:
            comparing a current state of the resource to a previous state of the resource;
            in response to determining that the current state of the resource has changed from the previous state, writing the current state for the resource to a trace data set;
            in response to determining that the current state of the resource has not changed from the previous state, moving to a next resource without writing the current state for the resource to the trace data set;
        for each resource that is not currently in use, moving to the next resource without writing the current state for the resource;
        determining users waiting for the resource and recording identifying information for the users waiting for the resource in the trace data set;
        for each user of the software component:
            writing a current state for the user to the trace data set in response to determining that the user is waiting for one or more resources;
            writing the current state for the user to the trace data set in response to determining that the user has one of: exclusive use of one or more resources; and shared use of one or more resources; and
            in response to determining that the user is waiting for one or more resources, writing the current state, wherein the current state comprises: identifying information for the one or more users that own the one or more resources; and the states of the one or more users that own the one or more resources.

2. The computer program product of claim 1, further comprising writing the current state for the resource as derived from one or more transaction progress markers created between timing intervals.

3. The computer program product of claim 1, wherein the trace operation is initiated at the expiration of a trace interval.

4. The computer program product of claim 3, further comprising dynamically adjusting a length of the trace interval.

5. The computer program product of claim 4, wherein dynamically adjusting the length of the trace interval comprises decreasing the length of the trace interval during periods of high resource contention for the software component.

6. The computer program product of claim 4, wherein dynamically adjusting the length of the trace interval comprises increasing the length of the trace interval during periods of low resource contention for the software component.

7. The computer program product of claim 1, wherein the software component comprises a virtual storage access method (VSAM) component operating on an operating system (OS).

8. A system for performing a software trace of a software component, the system comprising:
    a software component having executable instructions stored in memory and executable on a processor;
    a trace data set for storing data written by a trace facility; and
    a trace facility for performing a software trace of the software component, the trace facility comprising instructions for:
        initiating a trace operation for the software component, the trace operation comprising:
            for each resource of the software component, determining whether the resource is currently in use;
            for each resource that is currently in use:
                comparing a current state of the resource to a previous state of the resource;
                in response to determining that the current state of the resource has changed from the previous state, writing the current state for the resource to the trace data set;

in response to determining that the current state of the resource has not changed from the previous state, moving to a next resource without writing the current state for the resource to the trace data set;

for each resource that is not currently in use, moving to the next resource without writing the current state for the resource;

determining users waiting for the resource and recording identifying information for the users waiting for the resource in the trace data set;

for each user of the software component:

writing a current state for the user to the trace data set in response to determining that the user is waiting for one or more resources;

writing the current state for the user to the trace data set in response to determining that the user has one of exclusive use of one or more resources; and shared use of one or more resources; and in response to determining that the user is waiting for one or more resources, writing the current state, wherein the current state comprises identifying information for the one or more users that own the one or more resources; and the states of the one or more users that own the one or more resources.

9. The system of claim 8, wherein the trace operation is initiated at the expiration of a trace interval.

10. The system of claim 9, further comprising dynamically adjusting a length of the trace interval.

11. The system of claim 10, wherein dynamically adjusting the length of the trace interval comprises decreasing the length of the trace interval during periods of high resource contention for the software component.

12. The system of claim 10, wherein dynamically adjusting the length of the trace interval comprises increasing the length of the trace interval during periods of low resource contention for the software component.

13. A method for performing a software trace of a software component, the method comprising:

initiating a trace operation for the software component, the trace operation comprising:

for each resource of the software component, determining whether the resource is currently in use;

for each resource that is currently in use:

comparing a current state of the resource to a previous state of the resource;

in response to determining that the current state of the resource has changed from the previous state, writing the current state for the resource to a trace data set;

in response to determining that the current state of the resource has not changed from the previous state, moving to a next resource without writing the current state for the resource to the trace data set;

for each resource that is not currently in use, moving to the next resource without writing the current state for the resource;

determining users waiting for the resource and recording identifying information for the users waiting for the resource in the trace data set;

for each user of the software component:

writing a current state for the user to the trace data set in response to determining that the user is waiting for one or more resources;

writing the current state for the user to the trace data set in response to determining that the user has one of: exclusive use of one or more resources; and shared use of one or more resources; and in response to determining that the user is waiting for one or more resources, writing the current state, wherein the current state comprises: identifying information for the one or more users that own the one or more resources; and the states of the one or more users that own the one or more resources.

14. The method of claim 13, further comprising writing the current state for the resource as derived from one or more transaction progress markers created between timing intervals.

15. The method of claim 13, wherein the trace operation is initiated at the expiration of a trace interval.

16. The method of claim 15, further comprising dynamically adjusting a length of the trace interval.

* * * * *